United States Patent Office 3,836,522
Patented Sept. 17, 1974

3,836,522
PROCESS FOR THE MANUFACTURE OF 1,3-DI-PHENYL-4-METHYL-5-ALKYL-PYRAZOLINES
Tibor Somlo, Birsfelden, and Mauro Stagi, Allschwil, Switzerland, assignors to Ciba-Geigy AG, Basel, Switzerland
No Drawing. Filed Apr. 5, 1972, Ser. No. 241,379
Claims priority, application Switzerland, Apr. 19, 1971, 5,631/71
Int. Cl. C07d 49/10
U.S. Cl. 260—239.9
5 Claims

ABSTRACT OF THE DISCLOSURE

The present invention relates to 1,3-diphenyl-4-methyl-5-alkyl pyrazolines which are useful as optical brighteners for high molecular organic materials. The new compounds may be prepared by a new and inventive process.

---

The present invention relates to new 1,3-diaryl-4-methyl-5-alkyl-pyrazolines, their use for the optical brightening of synthetic and natural high molecular organic material, preferably of fibres or fabrics, and their use as additives to detergents and soaps, and also, in particular, an inventive process for their manufacture.

1,3-Diphenyl-pyrazolines are known from British Patent Specifications 669,590 and 669,591, but they impart an undesirable yellow-green discolouration to the detergents.

1,3-Diaryl-4-alkyl-pyrazolines, as described in British Patent Specification 712,764, show weak brightening effects which are inadequate for them to be used industrially.

1,3-Diphenylpyrazolines which can additionally be substituted in the 5-position by an alkyl group or by an unsubstituted phenyl group or a phenyl group possessing non-ionic and non-chromophoric substituents, possess a fluorescence of relatively low intensity and only produce weak brightening effects, especially in the absence of strongly acid groups. They are therefore not very suitable for the optical brightening of textiles, especially of fibre material of synthetic and natural polyamide, of polyacrylonitrile, of polyolefines or of 2½-acetate or triacetate.

It has now been found, surprisingly, that 1,3-diphenyl-4-methyl-5-alkyl-pyrazolines in which the phenyl ring located in the 1-position contains selected substituents, are valuable optical brighteners possessing a neutral white shade.

The pyrazoline compounds according to the invention correspond to the formula (1) 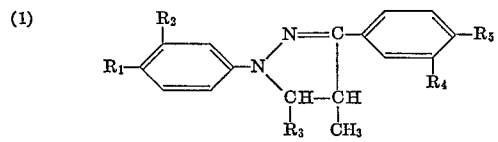

wherein $R_1$ denotes trifluoromethyl, nitrile, a

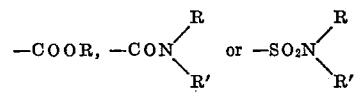

radical, wherein R and R' independently of one another represent hydrogen or alkyl containing 1 to 4 carbon atoms and optionally substituted by hydroxyl, alkoxy, amino, sulpho or carboxyl, or R and R' together with the nitrogen represent pyrrolidino or optionally methyl-substituted morpholino or piperidino, or denotes the $-SO_2R''$ radical, wherein $R''$ represents alkyl with 1 to 4 carbon atoms optionally substituted by hydroxyl, alkoxy, amino, sulpho or carboxyl or represents alkenyl with 2 to 4 carbon atoms or aryl, $R_2$ denotes hydrogen, chlorine or alkyl containing 1 to 3 carbon atoms, $R_3$ denotes alkyl with 1 to 15 carbon atoms or aralkyl, and $R_4$ and $R_5$ independently of one another denote hydrogen, halogen with up to atomic number 35, alkoxy, alkyl or acylamino with, in each case, 1 to 3 carbon atoms.

Within the framework of the definition according to the formula (1), compounds of predominant interest are those of the formula (2) 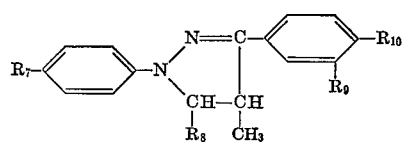

wherein $R_7$ denotes nitrile, a

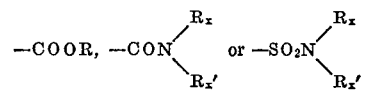

radical wherein $R_x$ and $R_x'$ independently of one another represent hydrogen or alkyl containing 1 to 4 carbon atoms and optionally substituted by hydroxyl, alkoxy, amino, sulpho or carboxyl, or denotes the radical $-SO_2R_x''$, wherein $R_x''$ represents alkyl with 1 to 4 carbon atoms optionally substituted by hydroxyl, alkoxy, amino, sulpho or carboxyl or represents alkenyl with 2 to 4 carbon atoms, $R_8$ denotes alkyl with 1 to 15 carbon atoms and $R_9$ and $R_{10}$ independently of one another denote hydrogen, chlorine or alkyl with 1 to 3 carbon atoms.

Preferred compounds correspond to the formula (3) 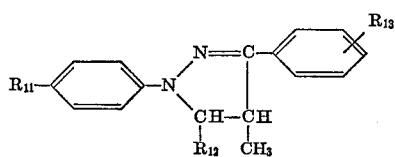

wherein $R_{11}$ denotes nitrile, carboxyl, cabalkoxy with 2 to 6 carbon atoms or methyl sulphonyl, $R_{12}$ denotes alkyl with 1 to 4 carbon atoms and $R_{13}$ denotes hydrogen, methyl or chlorine in the 3- or 4-position.

Compounds of outstanding practical interest are the pyrazolines of the formula (4) 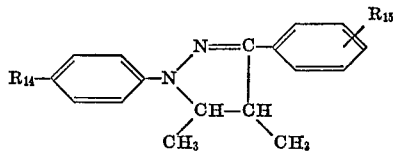

wherein $R_{14}$ denotes nitrile, methoxycarbonyl or methylsulphonyl and $R_{15}$ denotes hydrogen or chlorine in the 3- or 4-position.

The manufacture of 1,3-diarylpyrazolines in accordance with the equation

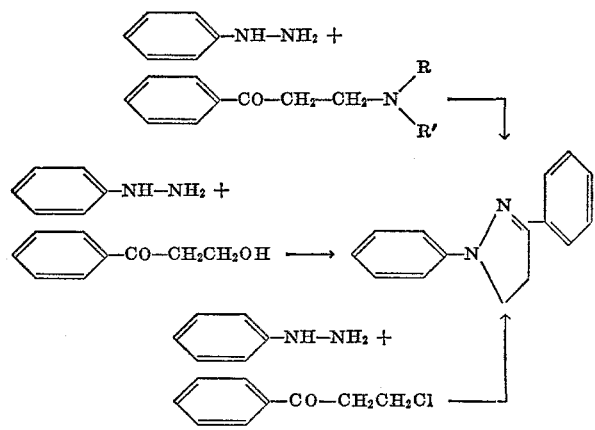

is known.

Analogously, it is to be expected that the corresponding 4-alkyl-substituted pyrazolines can be obtained from corresponding α-alkyl-substituted ketones. This is in fact the case if the condensation is carried out in accordance with the equation

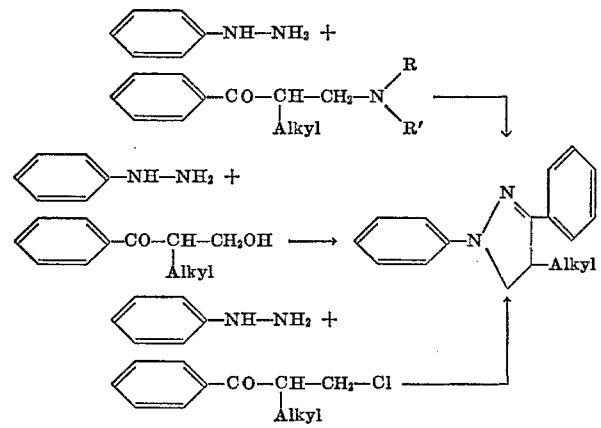

in an alkaline medium.

It has now been found, surprisingly, that the α-alkyl-substituted aryl-alkyl-ketones, when reacted with substituted phenylhydrazines under suitable reaction conditions, that is to say in a strongly acid medium, yield new 1,3-diaryl-4-methyl-5-alkyl-pyrazolines with rearrangement occurring:

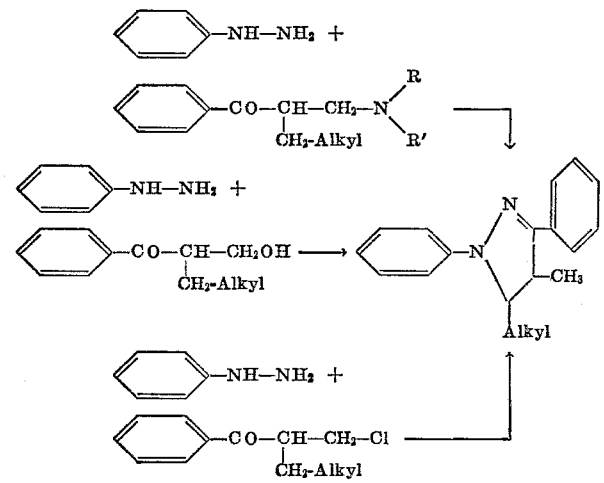

This novel rearrangement permits a simple synthesis of 1,3-diaryl-4-methyl-5-alkylpyrazolines which are otherwise not accessible or only accessible with difficulty, especially a simple synthesis of the compounds according to the invention of the formulae (1) to (4).

Accordingly, the compounds of the formula (1) are manufactured by reacting a phenylhydrazine of the formula (5) 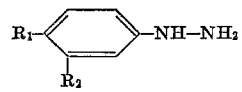

wherein $R_1$ and $R_2$ have the indicated meaning, with a ketone of the formula (6) 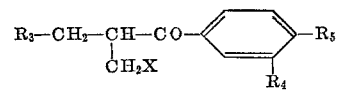

wherein X represents hydroxyl, chlorine or the

radical, with Y and Y' independently of one another denoting alkyl with 1 to 4 carbon atoms and Y and Y' together with the nitrogen denoting pyrrolidino or optionally methyl-substituted piperidino or morpholino, and $R_3$, $R_4$ and $R_5$ have the indicated meaning.

The reaction is carried out in the presence of a strong acid, in an aqueous, aqueous-organic or organic phase, at a pH value below 7. The reaction is preferably carried out in a strongly acid medium, and in general at least 1 mol of acid is employed per mol of phenylhydrazine. Strong acids used are, for example, p-toluenesulphonic acid or, advantageously, mineral acids, such as hydrochloric acid, phosphoric acid, sulphuric acid or perchloric acid or mixtures of such acids. Suitable organic solvents are in particular polar solvents, such as monohydric or polyhydric alcohols, for example methanol, ethanol, propanol, butanol, glycol and the like, diethylene glycol dialkyl ether, for example diethylene glycol dimethyl ether (diglyme), methylcellosolve and numerous others. If a small amount of polar solvent is employed as a solubilising agent, non-polar solvents, such as, say, benzene, toluene, xylene, chlorobenzene, dioxane and the like, can also be used. The reaction can be carried out at temperatures from room temperature upwards, for example, between 20 and 150° C. Temperatures of 60 to 120° C. are to be preferred for carrying out the reaction within industrially advantageous durations, for example within 3 to 8 hours.

In many cases, the reaction takes place practically quantitatively and very pure compounds are produced.

Cis- and trans-isomers can be produced in this reaction, and these can be manufactured more or less selectively by choice of the reaction conditions.

The new pyrazoline compounds of the formula (1) are valuable optical brighteners which display substantially higher fastness to light than the previously known 1-(4'-carbalkoxyphenyl)-3-phenyl-pyrazolines. They are furthermore distinguished by a neutral, that is to say less reddish-tinged, white shade, by better fastness to washing and resistance to peroxide, in comparison to the previously known 1-(4'-alkylsulphonyl)- and 1-(4'-sulphamoylphenyl)-3-phenyl-pyrazolines.

The brightness according to the invention do not cause soiling of polyester in the wash bath and display a very strong brightening of washing powders. In order to achieve a very particular shade of white it oftens proves advisable to employ mixtures of pyrazolines according to the invention. Such mixtures can be purely mechanical mixtures of the individual components or actual crystal compounds the crystal structure of which is different from that of the individual components. Such mixtures can be manufactured by dry mixing, fusing together or conjoint recrystallisation of the individual components.

The new pyrazoline compounds of the formula (1) are almost colourless to yellowish, well-crystallised substances which are sparingly soluble to insoluble in hot water. They dissolve in organic solvents, for example in alkanols, lower fatty acids, lower fatty acid esters, lower fatty acid amides, lower ketones and optionally halogenated aromatic hydrocarbons. The practically colourless solutions are distinguished by a vivid violet to blue fluorescence.

The new pyrazoline compounds are suitable for the optical brightening of high molecular organic material. Suitable high molecular organic materials are above all synthetic organic polyplasts, that is to say plastics obtainable by polymerisation, polycondensation and polyaddition, for example polyolefines, such as polyethylene, polypropylene or polystyrene, and polyvinyl chloride, polyacrylonitrile and its copolymers, or polyurethanes, polyamides and cellulose esters.

The optical brightening of the high molecular organic material is effected, for example, by incorporating into it small amounts of optical brighteners according to the invention, for example 0.0001 to 2%, preferably 0.001 to 0.3%, relative to the material to be brightened, optionally together with other substances, such as plasticisers, pigments and the like. Depending on the nature of the material to be brightened, this is done by dissolving the brightener in the monomers before polymerisation, in the polymer mass or, together with the polymer, in the solvent. The material pre-treated in this way is thereafter brought into the desired ultimate shape in accordance with processes which are in themselves known, such as calendering, pressing, extrusion, spreading, casting or injection moulding.

Preferably, however, high molecular material in the form of fibres is brightened, for example fibre material of polyamide, polyacrylonitrile and its copolymers, or cellulose esters, such as cellulose acetates. Advantageously, an aqueous dispersion of pyrazolines according to the invention, of the formula (1), is used for brightening these fibre materials. For this, the brightener dispersion preferably contains 0.001 to 0.2% of the pyrazoline according to the invention, relative to the fibre material. In addition, it can contain auxiliaries, such as dispersing agents, for example condensation products of fatty alcohols containing 10 to 18 carbon atoms with 15 to 25 mols of ethylene oxide, or condensation products of alkylmonoamines or polyamines containing 16 to 18 carbon atoms with at least 10 mols of ethylene oxide and, where fibre material of polymeric or copolymeric acrylonitrile is being brightened, also acids, especially organic acids, such as acetic acid, oxalic acid an preferably formic acid.

The brightening of the fibre material with the aqueous brightener dispersion is effected either by the exhaustion process at temperatures of, preferably, 60 to 100° C., or by the pad-therm process. In the latter case, the goods are impregnated with the brightener dispersion and are finished, for example by steaming at 70 to 100° C. with preferably saturated, neutral steam. The finished fibre-material is finally rinsed and dried. Preferably, the fibre material mentioned is brightened by the exhaustion process.

High molecular organic materials optically brightened in accordance with the invention, especially the synthetic fibre material brightened in accordance with the exhaustion process, shows an attractive, pure white appearance with a bluish-tinged fluorescence.

In the case of polyacrylonitrile, the addition of the optical brightener according to the invention in the swollen state of the polymer should be particularly mentioned.

The pyrazolines according to the invention can also serve as brighteners for detergents, for example for soaps, soluble salts of higher fatty alcohol-sulphates, higher and/ or multiple alkyl-substituted arylsulphonic acid, sulphocarboxylic acid esters of medium to higher alkanols, higher alkanols, higher alkanoyl-amino-alkyl- of -aminoaryl-carboxylic acids or -sulphonic acids or fatty acid-glycerine-sulphates, and also non-ionic detergents, such as higher alkylphenyl-polyglycol-ethers.

Detergents according to the invention can contain the customary fillers and auxiliaries, for example alkali polyphosphates and polymetaphosphates, alkali silicates, alkali borates, alkali salts of the carboxymethylcelluloses, foam stabilisers, such as alkanolamides of higher fatty acids, or complexones, such as soluble salts of ethylenediaminetetraacetic acid.

The new pyrazolines are appropriately incorporated into the detergents or into washing liquors in the form of their solutions in neutral organic solvents which are watermiscible and/or easily volatile, such as lower alkanols, lower alkoxyalkanols or lower aliphatic ketones. They can, however, also be used in a finely divided solid form, by themselves or mixed with dispersing agents. For example, they can be mixed, kneaded or ground with the detergent substances and the customary auxiliaries and fillers can then be admixed. The brighteners are, for example, stirred with the detergent substances, customary auxiliaries and fillers and water to give a paste, and this is then sprayed in a spray drier. The new pyrazoline derivatives can also be mixed into finished detergents, for example by spraying a solution in an easily volatile and/or water-soluble organic solvent onto the dry agitated detergent.

The content of optical brightener of the formula (1) in the detergent is advantageously 0.001 to 0.5% relative to the solids content of the detergent. Such detergents containing optical brighteners of the formula (1) in daylight possess a greatly improved, white appearance as compared to detergents devoid of brightener.

Washing liquors which contain pyrazolines according to the invention, of the formula (1), on washing impart to the textile fibres treated therewith, for example synthetic polyamide and cellulose ester fibres, a brilliant appearance in daylight. They can therefore be used particularly for the washing of these synthetic fibres or of the textiles or textile components consisting of such fibres, and of laundry. For use in household laundry, they can also contain yet further optical brighteners possessing affinity for other fibres, for example for cellulose.

Further details can be found in the examples which follow.

EXAMPLE 1

297 parts of 4-methylsulpho-phenylhydrazine hydrochloride are suspended in a mixture of 1,500 parts of n-butanol and 500 parts of 85% strength phosphoric acid. The suspension is heated to 105° C. whilst stirring and 249 parts of 4-chloro-α-hydroxymethyl-butyro-phenone are added dropwise at this temperature over the course of one hour. The resulting red-brown solution is stirred for a further 4 hours at 100 to 110° C., then cooled to 70° C. and washed at this temperature with 1,500 parts of water in several portions. Thereafter the mixture is cooled to 10° C. and stirred for some hours at this temperature, whereupon the product crystallises out. The light yellow crystal paste is thereafter filtered off and the filter residue is washed with butanol and water and dried in vacuo at 60 to 70° C. 350 parts of the compound of the formula (7)
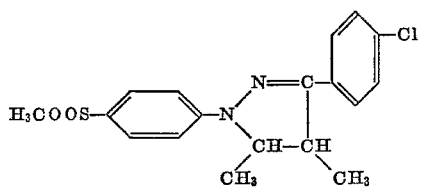

of melting point 163 to 170° C. are thus obtained. The same compound is obtained if instead of 4-chloro-α-hydroxymethyl - butyrophenone, 4-chloro-α-chloromethyl-butyrophenone or 4-chloro-α-dimethylamino-butyrophenone or 4-chloro-α-dimethylamino-butyrophenone are employed.

According to nuclear resonance spectra, the product consists of about ⅔ trans-isomer and ⅓ cis-isomer. The present process yields a very pure product which fluoresces with a very intense blue-violet colour in organic solvents. The product is above all used for the optical brightening of polyamide, cellulose acetate, cellulose triacetate and wool. If in the above case, instead of 4-methylsulphophenylhydrazine hydrochloride, equimolar amounts of the compound of the formula (8)
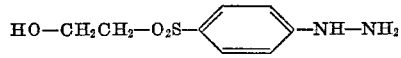

are employed, the pyrazoline derivative of the formula (9)
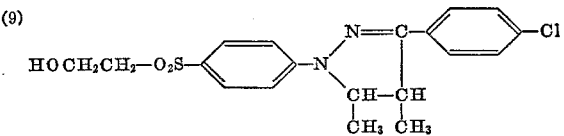

is obtained. The compounds of the following formulae can be manufactured from the compound of the formula 9 in accordance with known methods (compare, for example, Swiss Patent 418,286):

(10)
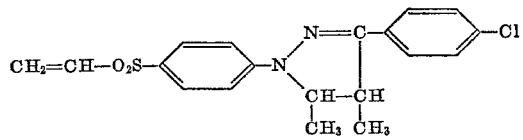

(11)
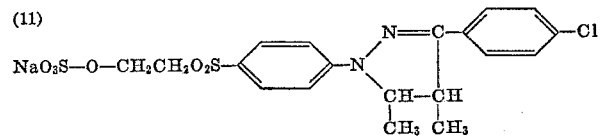

and

(12)
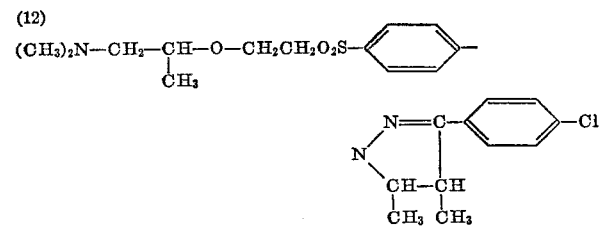

EXAMPLE 2

If in Example 1 the 297 parts of 4-methyl-sulphophenylhydrazine hydrochloride are replaced by 180 parts of 4-cyano-phenylhydrazine hydrochloride and the 249 parts of 4-chloro-α-hydroxymethyl-butyrophenone are replaced by 240 parts of 4-chloro-α-hydroxy-methyl-isocaprophenone, 274 parts of the compound of the formula

(13)
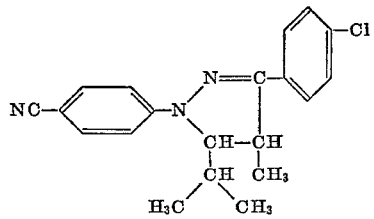

of melting point 160 to 174° C. are obtained. The same product is obtained if instead of 4-chloro-α-hydroxymethyl-isocaprophenone, 4-chloro - α - chloromethyl-isocaprophenone is used. The product is a mixture of a little of the cis-isomer and predominantly the trans-isomer. If the product is recrystallised from ethyl alcohol, the pure trans-isomer of melting point 174° C. is obtained.

Both the trans- and the cis-compounds, as well as their mixtures, fluoresce with a very intense blue-violet colour in organic solvents. The products are above all employed for the optical brightening of polyamide, polyacrylonitrile, cellulose acetate, cellulose triacetate and wool. On incorporation into detergents, they also very strongly brighten the washing powder.

EXAMPLE 3

10 parts of 4-carboxyphenylhydrazine hydrochloride, 160 parts of diglyme, 40 parts of concentrated hydrochloric acid, 50 parts of water and 10 parts of α-hydroxymethylcaprophenone are stirred together, heated to the boil and boiled for 5 hours under reflux. The reaction mixture is then cooled and poured into water. The crystals which precipitate are filtered off and can be recrystallised from methanol. The compound of the formula

(14)
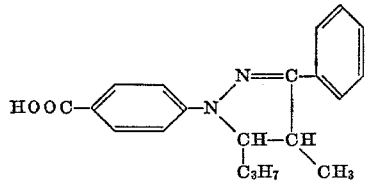

of melting point 210° C. is thus obtained. If instead of α-hydroxymethyl - caprophenone, α-diethylaminomethyl-caprophenone is employed, the same compound is obtained. The compound gives an intense red-violet fluorescence in organic solvents and is suitable for the optical brightening of soap as well as of casting compositions and fibre materials of polyolefines, polyamide, cellulose acetate and cellulose triacetate.

If the compound of the formula (14) is converted by means of thionyl chloride into the carboxylic acid chloride of the formula

(15)
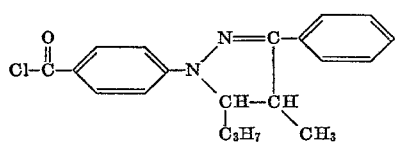

and the latter is esterified with an alcohol of the formula

(16) HO—CH₂CH₂—OH
(17) HO—CH₂CH₂—OCH₃
(18) 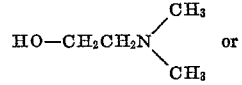 or

(19) 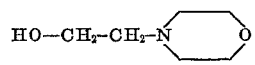

the pyrazolines of the formulae

(20) 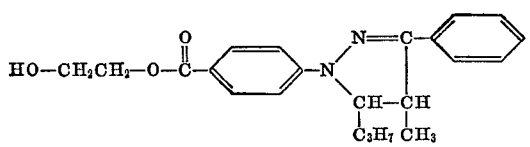

(21) 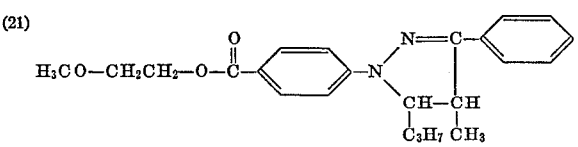

(22) 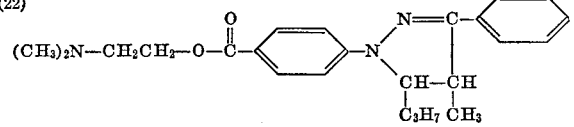

and

(23) 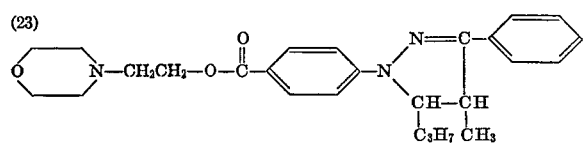

and
are obtained. If the compound of the formula (15) is reacted with dimethylamine, morpholine or pyrrolidine, the pyrazolines of the formula.

(24) 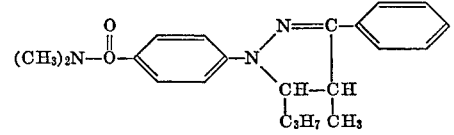

(25) 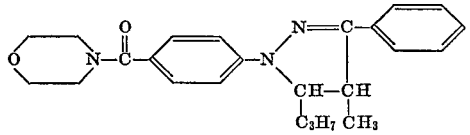

and

(26) 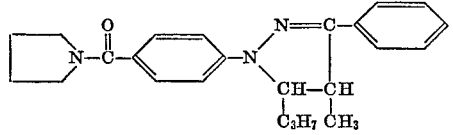

are obtained.

EXAMPLE 4

135 parts of 4-carboxymethyl-phenylhydrazine hydrochloride are suspended in 2,000 parts of methanol and 200 parts of concentrated sulphuric acid are slowly added, in the course of which the temperature must not exceed 40° C. Thereafter 107 parts of α-hydroxymethyl-butyrophenone are added dropwise at 40° C. and the mixture is stirred for 4 days at the same temperature. After a reaction time of 12 hours, the product begins to crystallise out in almost colourless needles. After 4 days' reaction time, the mixture is further stirred for some hours at 0° C. and then filtered, and the light yellow filter residue is washed with water until neutral. It is then dried in vacuo at 70 to 80° C. 40 parts of the compound of the formula

(27) 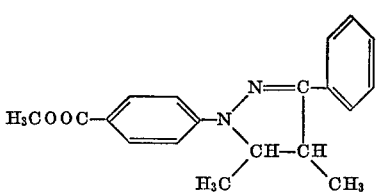

of melting point 169 to 173° C. are thus obtained. The same compound is obtained if instead of α-hydroxymethyl-butyrophenone, α-chloromethyl-butyrophenone or α-piperiodino-methyl-butyrophenone are employed. If the product is recrystallised from ethanol, the pure cis-compound is obtained as colourless needles of melting point 173° C.

EXAMPLE 5

If one of the methods indicated in Examples 1 to 4 is used and molar amounts of the p-substituted phenylhydrazine hydrochlorides and α-hydroxymethyl- or α-chloromethyl- or α-dialkyaminomethyl-aryl-alkyl-ketones indicated in the table which follows are employed, the 1,3-diaryl-4-methyl-5-alkyl-pyrazolines of the formula

(28) 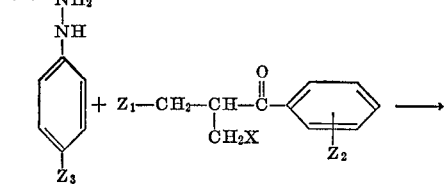

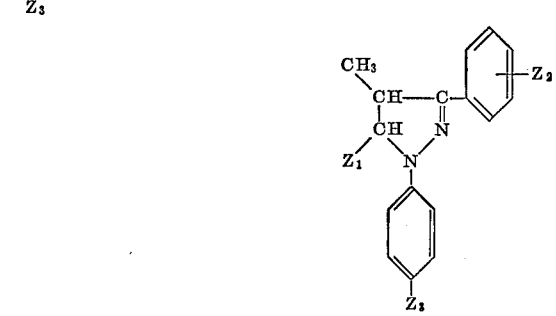

X=—OH, Cl,

indicated below are obtained.

| Compound of the formula | $Z_1$ | $Z_2$ | $Z_3$ | Melting point, °C. | cis=c trans=t |
|---|---|---|---|---|---|
| 29 | CH₃ | H | SO₂CH₃ | 153 | c |
| 30 | CH₃ | H | SO₂CH₃ | 113-145 | c+t |
| 31 | CH₃ | H | SO₂CH₃ | 110-111 | t |
| 32 | CH₃ | m-Cl | SO₂CH₃ | 158-159 | c |
| 33 | CH₃ | p-Cl | COOCH₃ | 128-129 | c |
| 34 | CH₃ | m-Cl | COOCH₃ | 131-164 | c |
| 35 | CH₃ | p-Cl | COOCH₃ | 130-131 | c |
| 36 | CH₃ | p-Cl | CN | 174-175 | c |
| 37 | CH₃ | p-Cl | CN | 116-118 | t |
| 38 | CH₃ | p-Cl | CN | 120-145 | c+t |
| 39 | CH₃ | m-Cl | CN | 115-116 | t |
| 40 | nC₃H₇ | H | SO₂CH₃ | 145-146 | |
| 41 | nC₃H₇ | H | SO₂CH₃ | 182-183 | |
| 42 | nC₃H₇ | p-Cl | SO₂CH₃ | 113-115 | c |
| 43 | nC₃H₇ | p-Cl | SO₂CH₃ | 136-137 | t |
| 44 | nC₃H₇ | p-CH₃ | SO₂CH₃ | 154-156 | t |
| 45 | nC₃H₇ | H | COOCH₃ | 104-105 | c |
| 46 | nC₃H₇ | p-Cl | COOCH₃ | 116-117 | c |
| 47 | nC₃H₇ | p-CH₃ | COOCH₃ | 107-108 | |
| 48 | nC₃H₇ | p-CH₃ | COOH | 200-206 | |
| 49 | nC₃H₇ | p-Cl | CN | 128-131 | t |
| 50 | nC₃H₇ | p-CH₃ | CN | 131-144 | |

| Compounds of the formula | $Z_1$ | $Z_2$ | $Z_3$ | Melting point, °C. | cis=c trans=t |
|---|---|---|---|---|---|
| 51 | iso $C_3H_7$ | H | $SO_2CH_3$ | 166–167 | t |
| 52 | iso $C_3H_7$ | p-Cl | $SO_2CH_3$ | 145 | c |
| 53 | iso $C_3H_7$ | p-Cl | $SO_2CH_3$ | 145–190 | c+t |
| 54 | iso $C_3H_7$ | p-Cl | $SO_2CH_3$ | 210–212 | t |
| 55 | iso $C_3H_7$ | H | $COOCH_3$ | 141–142 | t |
| 56 | iso $C_3H_7$ | p-Cl | $COOCH_3$ | 132–134 | t |
| 57 | iso $C_3H_7$ | H | CN | 126–127 | t |
| 58 | iso $C_3H_7$ | p-Cl | $SO_2-N(CH_3)_2$ | 137–165 | c+t |
| 59 | iso $C_3H_7$ | p-Cl | $SO_2-C_6H_4-CH_3$ | 156–158 | t |
| 60 | $C_{13}H_{27}$ | p-Cl | $SO_2CH_3$ | 78–79 | t |

EXAMPLE 6

9 parts of 4-cyano-phenylhydrazine hydrochloride and 12 parts of 4 - chloro-α-hydroxymethyl-isocaprophenone are suspended in 205 parts of methanol. 30 parts of 85% strength phosphoric acid are added to the suspension and the mixture is stirred for 48 hours at 40° C. Thereafter the product which has crystallised out is filtered off, washed with water until neutral and dried in vacuo. 11 parts of a non-fluorescing compound having a melting point of 187–189° C. are thus obtained. Thereafter, the product is dissolved in 50 parts of chlorobenzene, 3 parts of p-toluenesulphonic acid are added to the solution and the mixture is boiled for 2 hours under reflux. After distilling off the chlorobenzene, the residue is treated with 30 parts of methanol, whereupon the compound of the formula (61)

[Structure: NC-C6H4-N(CH-CH(CH(CH3)2))-N=C-C6H4-Cl with CH3]

crystallises out. Melting point 148 to 158° C. About ⅔ trans and ⅓ cis.

EXAMPLE 7

If one of the methods indicated in Examples 1 to 4 is followed and molar amounts of the p-substituted phenylhydrazine hydrochlorides and α-hydroxymethyl- or α-chloromethyl- or α-dialkylaminomethyl-aryl-alkyl-ketones indicated in the table which follows are used, the 1,3-diaryl-4-methyl-5-alkyl-pyrazolines of the formula

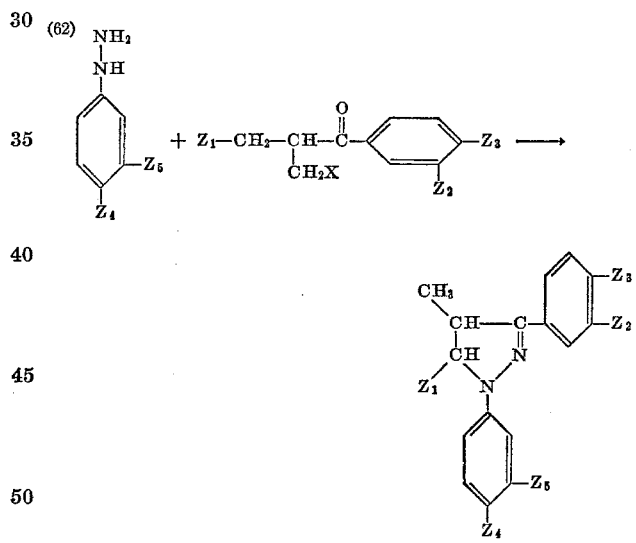

$X = -OH, Cl, N(alkyl)(alkyl)$ are obtained.

| Compound of the formula | $Z_1$ | $Z_2$ | $Z_3$ | $Z_4$ | $Z_5$ |
|---|---|---|---|---|---|
| (63) | $CH_3$ | —$NHCOCH_3$ | H | $CF_3$ | H |
| (64) | $CH_3$ | H | $NHCOCH_3$ | $CF_3$ | H |
| (65) | $CH_3$ | H | $OCH_3$ | $CF_3$ | H |
| (66) | $CH_3$ | $CH_3$ | $OCH_3$ | $CF_3$ | H |
| (67) | $C_3H_7$ | Cl | $CH_3$ | $SO_2CH_3$ | H |
| (68) | $C_3H_7$ | Cl | Cl | $SO_2CH_3$ | H |
| (69) | $C_3H_7$ | H | Cl | $SO_2CH_3$ | $CH_3$ |
| (70) | $C_3H_7$ | H | Cl | $COOCH_3$ | Cl |
| (71) | —$CH_2-C_6H_5$ | H | Cl | $COOCH_3$ | H |

EXAMPLE 8

Brightening of Nylon in a Wash Bath 0.4 g. of detergent of the following composition is added to 100 ml. of water:

|  | Percent |
|---|---|
| Dodecylbenzenesulphonate | 16 |
| Fatty alcohol-sulphonate | 4 |
| Na tripolyphosphate | 35 |
| Tetra-Na pyrophosphate | 7 |
| Mg silicate (MgSiO$_3$) | 2 |
| Na disilicate (Na$_2$(SiO$_3$)$_2$) | 7 |
| Carboxymethylcellulose | 1 |
| Sequestrene ST | 0.5 |
| Glauber's salt (approx.) | [1] 25 |
| Water | 2.5 |

[1] Instead of Glauber's salt, the detergent can also contain 10 to 20% of Na perborate or of some other oxygen-donating agent.

A solution of the optical brightener of the formula (37) is prepared by dissolving 1 g. in 1,000 ml. of DMF. 2 ml. of this stock solution are added to the solution described above. This aqueous solution (or dispersion) containing the brightener is warmed to 60° C. A nylon fabric weighing 3 g. is then introduced into the solution and is treated at this temperature for 30 minutes. The fabric is then rinsed for 2 minutes in running cold water and is subsequently dried for 20 minutes at 60° C.

The fabric treated in this way shows a distinct brightening effect. Equally good effects are obtained analogously if instead of the compound of the formula (37) the compounds of the formulae (33), (34), (38), (39), (49), (50), (53) and (57) are employed.

EXAMPLE 9

Brightening of Polyamide by the Exhaustion Process under Acid Conditions 0.12 ml. of 85% strength formic acid and 0.06 g. of alkylpolyglycol-ether are added to 100 ml. of water.

A solution of the optical brightener of the formula (7) is prepared by dissolving 1 g. in 1,000 ml. of DMF. 3 ml. of this stock solution are added to the solution described above. This aqueous solution or dispersion containing the brightener is warmed to 60° C. and a polyamide fabric weighing 3 g. is then introduced into the solution. The temperature is raised to 92–95° C. over the course of 10 to 15 minutes and is left thereat for 30 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (7) the compounds of the formulae (13), (14), (27), (32), (33), (34), (36), (37), (38), (39), (46), (50), (52), (53), (57), (59), (60), or (61) are employed.

EXAMPLE 10

Brightening of Polyamide by the Exhaustion Process Under Neutral Conditions 0.06 g. of alkyl-polyglycol-ether are added to 100 ml. of water.

A solution of the optical brightener of the formula (36) is prepared by dissolving 1 g. in 1,000 ml. of DMF. 3 ml. of this stock solution are added to the solution described above. This aqueous solution or dispersion containing the brightener is warmed to 60° C. and a nylon fabric weighing 3 g. is then introduced into the solution. The temperature is raised to 92–95° C. over the course of 10 to 15 minutes and is left thereat for 30 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (36) the compounds of the formulae (7), (13), (27), (32), (33), (37), (38), (39), (46), (49), (50), (52), (53), (54), (57), (59), (60), or (61) are employed.

EXAMPLE 11

Brightening of Orlon by the Exhaustion Process under Acid Conditions 0.12 ml. of 85% strength formic acid and 0.06 g. of alkylpolyglycol-ether are added to 100 ml. of water.

A solution of the optical brightener of the formula (38) is prepared by dissolving 1 g. in 1,000 ml. of DMF. 1.5 ml. of this stock solution are added to the solution described above. This aqueous solution or dispersion containing the brightener is warmed to 60° C. and an orlon fabric weighing 3 g. is then introduced into the solution. The temperature is raised to 95–98° C. over the course of 10 to 15 minutes and is left thereat for 60 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (38) the compounds of the formulae (32), (37) or (39) are employed.

EXAMPLE 12

Brightening of 2½-Acetate by the Exhaustion Process under Acid Conditions 0.06 ml. of 40% strength acetic acid and 0.06 ml. of alkyl-polyglycol-ether are added to 95 ml. of water.

A solution of the optical brightener of the formula (14) is prepared by dissolving 1 g. in 1,000 ml. of DMF. 6 ml. of this stock solution are added to the solution described above. This aqueous solution or dispersion containing the brightener is warmed to 40° C. and an acetate fabric weighing 3 g. is then introduced into the solution. The temperature is raised to 75–80° C. over the course of 10 to 15 minutes and is left thereat for 30 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (14) the compounds of the formulae (7), (30), (31), (32), (37), (38), (39), (43), (44), (45), (50), (51), (52), (53), (54), (55), (57), or (61) are employed.

EXAMPLE 13

Brightening of Triacetate by the Exhaustion Process under Acid Conditions 0.06 ml. of 40% strength acetic acid and 0.06 ml. of alkyl-polyglycol-ether are added to 95 ml. of water.

A solution of the optical brightener of the formula (49) is prepared by dissolving 1 g. in 1,000 ml. of DMF. 6 ml. of this stock solution are added to the solution described above. This aqueous solution or dispersion containing the brightener is warmed to 60° C. and a triacetate fabric weighing 3 g. is then introduced into the solution. The temperature is raised to 95–98° C. over the course of 10 to 15 minutes and is left thereat for 30 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (49) the compounds of the formulae (7), (13), (31), (37), (38), (39), (51), (52), (53), (57) or (61) are employed.

EXAMPLE 14

Brightening of Wool in a Reducing Bleach Bath Under Neutral Conditions 0.36 g. of Clarit Ps and 0.06 g. of alkyl-polyglycolether are added to 110 ml. of water.

A solution of the optical brightener of the formula (39) is prepared by dissolving 1 g. in 1,000 ml. of DMF. 7.5 ml. of this stock solution are added to the solution described above. This aqueous solution or dispersion containing the brightener is warmed to 40° C. and a prebleached woolen fabric or yarn weighing 3 g. is then introduced into the solution. The temperature is raised to 60° C. over the course of 10 to 15 minutes and is left thereat for 60 minutes. The fabric is then rinsed for 2 minutes in running cold water and is subsequently dried for 20 minutes at 60° C.

The fabric treated in this way shows a distinct brightening effect.

Equally good results are obtained if instead of the compound of the formula (39) the compounds of the formulae (7), (14), (37), (38), (44), (45) or (48) are employed.

EXAMPLE 15

An intimate mixture of 100 parts of polyvinyl chloride, 3 parts of stabiliser (Advastat BD 100; Ba/Cd complex), 2 parts of titanium dioxide, 59 parts of dioctylphthalate and 0.01 to 0.2 part of the compound of the formula (7) is milled on a calender at 150 to 155° C. to give a sheet. The opaque polyvinyl chloride sheet thus obtained has a substantially higher degree of whiteness than a sheet which does not contain the optical brightener.

EXAMPLE 16

7 g. of anatas ($TiO_2$) followed by 350 g. of acrylonitrile polymer in powder form are added to 1,400 ml. of dimethylformamide. The mixture is converted into a viscous mass, using a high speed stirrer. 5 mg. of the compound of the formula (7) or (60) are dissolved in 50 g. of this 20 percent strength polyacrylonitrile solution and after removal of the air bubbles the mass is cast on a glass plate and spread by means of a metal rod with 1 mm. thick guide sleeves to give a uniform film. After drying in a stream of air, the film can be pulled off the glass plate. It has a substantially higher degree of whiteness than a film manufactured in the same way, which does not contain the optical brightener.

EXAMPLE 17

1.5 g. of a delustering agent, 1 g. of titanium dioxide (rutile type) and 0.05 g. of a compound of the formula (7) or (60) are stirred into a polyurethane coating composition of 13.3 g. of isocyanate-modified polyester, 26.7 g. of ethyl acetate, 2 g. of reaction accelerator and 2 g. of polyfunctional isocyanate as a crosslinking agent. This mixture is left to stand for 2 hours and is then spread by means of a knife or a film-pulling rod on a cotton fabric (wet film thickness 1 mm.). The fabric is then dried for 24 hours at room temperature. The fabric coated in this way shows a strong optical brightening effect of good fastness to light.

EXAMPLE 18

10,000 parts of a polyamide, in chip form, manufactured from ε-caprolactam in a known manner are mixed with 30 parts of titanium dioxide (rutile modification) and 2 parts of the compound of the formula (7) or (60) for 12 hours in a tumbler vessel. After displacing the atmospheric oxygen, the chips treated in this way are fused in a kettle heated to 270° C. and the melt is stirred for half an hour. Thereafter the melt is extruded under a nitrogen pressure of 5 atmospheres gauge through a spinneret and the cooled filament is wound up on a spinning bobbin. The filaments obtained show an excellent brightening effect which is stable to thermofixing and has good fastness to washing and to light.

We claim:

1. Process for the manufacture of a pyrazoline compound of the formula

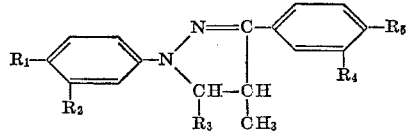

wherein $R_1$ denotes trifluoromethyl, nitrile, —COOH, —COO ($C_1$-$C_4$) alk, —COO ($C_1$-$C_4$) hydroxyalk,

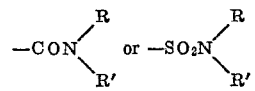

wherein R and R' independently of one another represent hydrogen or alkyl of 1 to 4 carbon atoms, or R and R' together with the nitrogen represent pyrrolidino, morpholino, piperidino, methyl-substituted morpholino or piperidino, or $R_1$ denotes —$SO_2R$ "wherein R" represents alkyl of 1 to 4 carbon atoms or alkyl of 1 to 4 carbon atoms substituted by hydroxyl, primary amino, sulpho or carboxyl or represents alkenyl of 2 to 4 carbon atoms, $R_2$ denotes hydrogen, chlorine or alkyl of 1 to 3 carbon atoms, $R_3$ denotes alkyl of 1 to 15 carbon atoms, and $R_4$ and $R_5$ independently of one another denote hydrogen, halogen with up to atomic number 35, alkoxy, alkyl or alkanoylamino of, in each case, 1 to 3 carbon atoms, characterised in that a phenylhydrazine of the formula

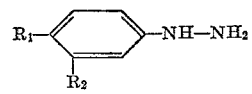

wherein $R_1$ and $R_2$ have the indicated meaning, is reacted with a ketone of the formula

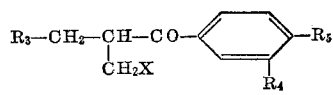

wherein X represents hydroxyl, chlorine or

with Y and Y' independently of one another denoting alkyl of 1 to 4 carbon atoms or Y and Y' together with the nitrogen denoting pyrrolidino, piperidino, morpholino, methyl-substituted piperidino or morpholino, and $R_3$, $R_4$ and $R_5$ have the indicated meaning, in the presence of at least one mol of a strong acid at a pH value below 7, in the aqueous-organic or organic phase, at temperatures above 20° C.

2. Process according to Claim 1, characterised in that the reaction is carried out in the presence of a mineral acid in a polar organic solvent, preferably lower alcohols or their ethers.

3. Process according to Claim 1, characterised in that the reaction is carried out in the presence of a mineral acid in an aqueous-organic phase, with the organic phase consisting of a polar solvent, preferably lower alcohols or their ethers.

4. Process according to Claim 1, characterised in that the reaction is carried out in the presence of an additional non-polar organic solvent selected from the group consisting of benzene, toluene, xylene, chlorobenzene and dioxane.

5. Process according to Claim 1, characterised in that the reaction is carried out at temperatures from 60 to 120° C., the reaction time being within 3 to 8 hours.

References Cited

FOREIGN PATENTS

| | | | |
|---|---|---|---|
| 982,710 | 2/1965 | Great Britain | 260—310 D |
| 1,453,061 | 8/1966 | France | 260—310 D |
| 750,922 | 1/1967 | Canada | 260—310 D |
| 712,764 | 7/1954 | Great Britain | 260—310 D |

NATALIE TROUSOF, Primary Examiner

U.S. Cl. X.R.

117—33.5 T; 252—301.2 W, 301.3 W; 260—247.1, 247.2 B, 247.5, 293.7, 310 D